J. R. S. BLAINE.
SPIRAL INDICATOR.
APPLICATION FILED JULY 5, 1910.

1,033,866.

Patented July 30, 1912.

Witnesses:

Inventor:
Joseph R. S. Blaine,
By Linthicum Belt & Fuller
Attys.

UNITED STATES PATENT OFFICE.

JOSEPH R. S. BLAINE, OF BELOIT, WISCONSIN, ASSIGNOR TO THE BERLIN MACHINE WORKS, OF BELOIT, WISCONSIN, A CORPORATION OF WISCONSIN.

SPIRAL INDICATOR.

1,033,866.   Specification of Letters Patent.   Patented July 30, 1912.

Application filed July 5, 1910. Serial No. 570,332.

*To all whom it may concern:*

Be it known that I, JOSEPH R. S. BLAINE, a citizen of the United States, residing at Beloit, in the county of Rock and State of Wisconsin, have invented certain new and useful Improvements in Spiral Indicators, of which the following is a specification.

My invention has for its object the construction and production of a graduated indicator or device of similar character which will be capable of indicating fine and minute gradations, but which at the same time will occupy but small space and will be composed of comparatively few parts.

Heretofore in order to have an indicator capable of registering small movements of parts it has been necessary to make the device of considerable size. This objectionable feature is overcome in my improved construction by dividing the graduated scale into two parts, as will be readily understood from the following detailed description of a preferred and desirable embodiment of the invention.

Figure 1:
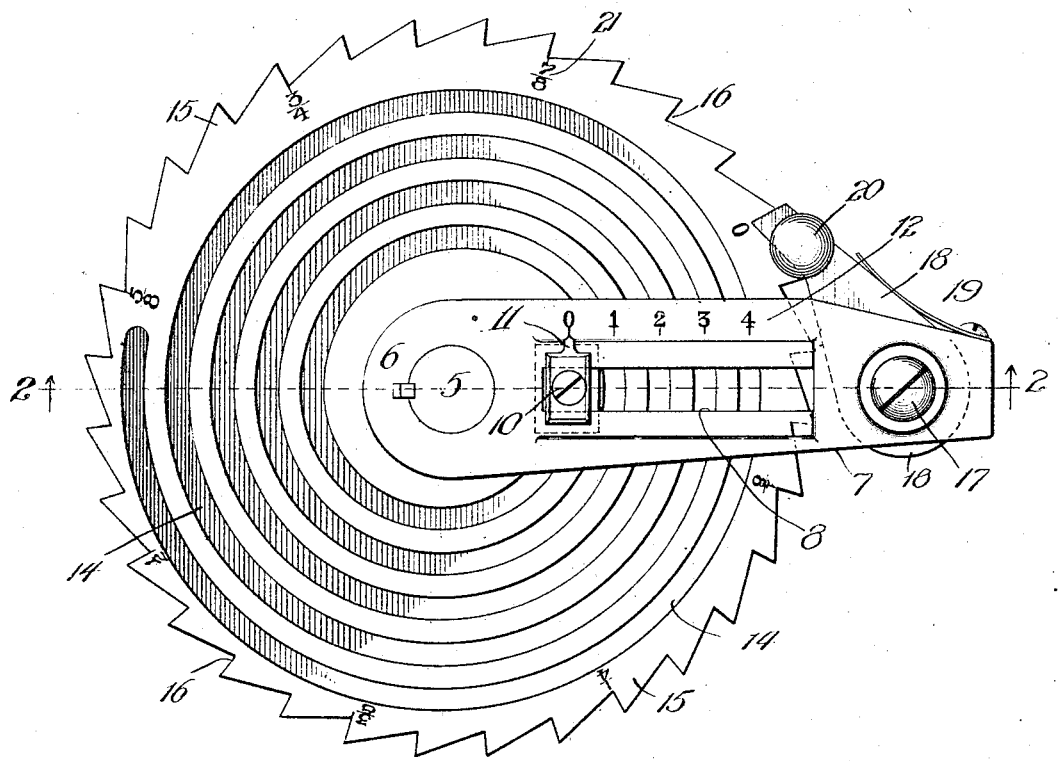
Figure 2:
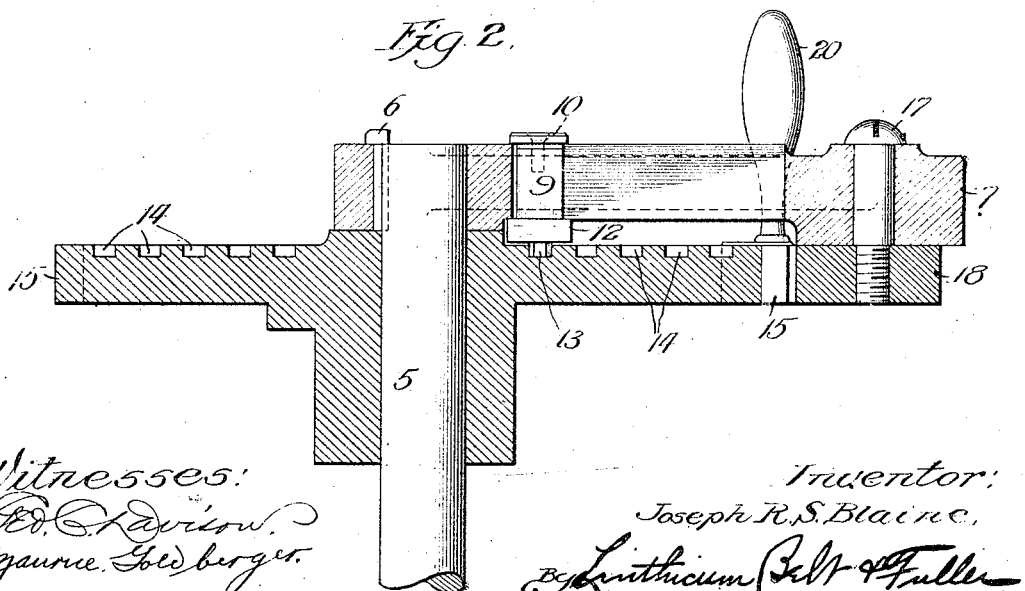

In the accompanying drawings, which form a part of this specification,—Figure 1 is a face view of one of my improved forms or styles of indicators; and Fig. 2 is a section through the same on line 2—2 of Fig. 1, the parts being viewed in the direction indicated by the arrows.

Referring to the drawings, it may be explained that the rotary shaft 5 is the part which it is desired to move given and definite amounts, an indicator of this character being of particular use in the set works of saw-mills, but, as will be readily appreciated, its employment is in no wise limited to restricted to such use. Fastened to the end of this shaft by means of a key 6 is an arm 7 by means of which the shaft is turned. Such arm is provided with a longitudinal slot 8 extended therethrough and positioned substantially-radially with respect to shaft 5. This slot, which has flat sides, accommodates a movable indicator or block 9 having secured to its top by a screw 10 an index pointer 11 which coöperates with the graduations of a scale 12 on the arm adjacent to the path of travel of such finger or index. The main body of the block 9 is substantially square in cross-section and slidingly fits in the groove 8, the part 12 of the block below the arm 7 being somewhat enlarged to prevent the block from leaving its receiving slot 8. The lower or inner reduced end 13 of the block fits in a spiral groove 14 cut or provided in the face of a stationary member 15 supplied around its circular periphery with a plurality of notches 16. As is clearly shown, this groove of flat spiral form encircles the shaft 5, whereby when the arm 7 is turned around the axis of shaft 5 the indicator 11 is caused to travel outwardly or inwardly of the slot 8 along the scale 12, depending upon the direction of rotation of the arm. The groove 14 and the scale 12 are so arranged that one complete revolution of the arm will occasion a movement of the pointer from one numeral to the next, for instance, from zero to 1.

For a planer set works numerals 1, 2, 3, and 4 of the scale 12 on arm 7 ordinarily indicate inches. On a screw 17 extended through the outer end of arm 7 I pivot a pawl or dog 18 pressed inwardly toward shaft 5 by a suitable spring 19, in the present instance a leaf-spring, such pawl being also equipped with a handle 20 near its free end. As I have indicated in Fig. 1, the end of such pawl or dog is intended and adapted to drop into the various notches 16 and hold the arm 7 in the desired position and against unintentional movement. The member 15 is circularly graduated at 21, in the present instance in fractions of an inch, and since each eighth of an inch as represented on this round scale is provided with four notches, each notch, therefore, represents $\frac{1}{32}$ of an inch.

The actuation and manipulation of this indicator is substantially as follows: Assuming that the index or pointer 11 is opposite zero, the pawl 18 must also be in the notch 0 of the scale 21, otherwise the inch index 11 could not be exactly opposite the zero of its scale 12. If it is desired to rotate the shaft 5 an amount sufficient to occasion the sawing of boards or planks of $2\frac{5}{8}$ inch thickness, the operator grasps the handle 20 and swings arm 7 and the attached pawl 18 in a clock-wise direction until the arm 7 has made not only two complete revolutions but also a part of an additional revolution until the pawl drops into the notch characterized $\frac{5}{8}$. The main pointer 11 under these circumstances will be between the figures 2 and 3, showing that the mechanism has been set to cut boards of more than 2 inch thickness, the excess over 2 inches being indicated on the circular scale 21 by the graduation ⅝. It should, therefore, be perfectly clear that the indication on scale 12 by means of pointer 11 represents whole inches, the additional fractions of an inch being indicated by the pawl 18 on the circular scale 21. In turning the arm 7 in a clock-wise direction the pawl 18 readily rides over the external teeth of the stationary member 15, but if it is desired to turn the arm in the opposite direction the workman or operator must maintain the pawl in retracted position during the rotation of the parts, all of which will be readily appreciated and understood from a consideration of Fig. 1 of the drawings.

While I have herein indicated that the two scales are for inches and fractions of an inch, the invention is in no wise limited to such graduation, nor is the invention restricted to the precise and exact details of construction shown and described, because these may be modified within wide limits without departure from the substance of the invention and without the sacrifice of any substantial benefits and advantages. To those skilled in this art it will be apparent that the object sought is attained in a construction of this kind in that the indicator herein set forth provides for fine graduations and yet the device is quite compact and simple in construction. It should also be noted that, if desirable or feasible, the arm 7 may be stationary and the member 15 rotatable with the shaft. In either instance the pointer 11 and pawl 18 will indicate the movement of the shaft on their corresponding scales.

I claim:

In a device of the character described, the combination of a circularly-graduated notched stationary member having a spiral groove, a longitudinally-graduated slotted rotary member, a pawl on said rotary member adapted to co-act with the notches of said stationary member, and an index block in said slot coöperating with said groove and the graduations of said rotary member, whereby the extent of rotation of said rotary member is indicated by said index block on the graduations of said rotary member and by said pawl on the circular graduations of said stationary member, substantially as described.

JOSEPH R. S. BLAINE.

Witnesses:
F. A. HORSTMANN,
TILLA SOLIEN.